United States Patent Office 3,239,415

Patented Mar. 8, 1966

3,239,415

METHODS OF REDUCING VIRUS TITERS IN ANIMALS WITH ADENINE DERIVATIVES

Gerald E. Underwood, Galesburg, Mich., assignor to The Upjohn Company, Kalamazoo, Mich., a corporation of Delaware No Drawing. Filed Jan. 14, 1963, Ser. No. 251,018
2 Claims. (Cl. 167—53)

This invention relates to antiviral compositions containing $N^6$-(hydroxyalkyl) adenines and to a method for their use.

The primary active ingredients utilized in the novel compositions and method of this invention are represented by the formula

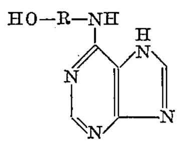

R being methylene or ethylene. Thus, specifically included as active ingredients are $N^6$-(hydroxymethyl) adenine and $N^6$-(2-hydroxyethyl) adenine. Except where otherwise indicated, the foregoing designations include the physiologically acceptable acid addition salts of such compounds, e.g., the hydrochloride, sulfate, phosphate, citrate, succinate, maleate, tartrate and the like. It is apparent that these compounds can exist in tautomeric forms, and all references to such compounds specifically include the tautomers thereof.

The $N^6$-hydroxyalkyl adenines can be prepared as described in U.S. Patent No. 2,844,577.

$N^6$-(2-hydroxyethyl) adenine has been found unexpectedly useful in reducing virus titers and hence is active as an antiviral agent. For example, in mice infected with Coe virus the paralytic aspects of the disease have been modified, the number of deaths reduced and virus titers in certain organs and tissues significantly lowered by administration of such compounds. Significant reduction in titers have also been shown against PR–8 virus.

Pharmaceutical compositions containing the presently described active ingredients, based on activity demonstrated against representative viruses, alter favorably the course of viral diseases in animals caused by respiratory viruses such as Coe virus and influenza virus (e.g., PR–8 virus); other Coxsackie viruses; measles; and veterinary virus infections such as infectious bronchitis, shipping fever virus in cattle, and distemper in dogs. Such compounds have been found sufficiently low in toxicity to enable satisfactory therapeutic ratios to be developed. Benefits from treatment of animals and birds derive from reduction of virus titers, interference wtih a secondary viral effect with consequent shortening of the illness, prevention of infection by a regimen of prophylactic medication, and interference with the metabolism of the host cell to decrease virus synthesis.

In utilizing the compositions and practicing the method of this invention for the treatment of virus diseases in animals, the exact schedule of administration should be determined individually according to the subject's age, weight, response to the medication and nature and severity of the infection. In general, a dosage of from about 50 to about 6000 mg. daily in single or divided doses can be employed, from about 250 to about 1000 mg. 1 to 4 times a day being preferred. Solid oral dosage units of from about 50 to about 1000 mg. afford convenient dose sizes. For topical use, such as in nasal drops or sprays, a concentration from about 0.5 to about 5% is suitable.

The principal active ingredient is conveniently incorporated into animal and bird feed carriers of both the premix and ready-mix types. The former contains edible diluents of the types previously mentioned, such as starch, oatmeal, flour, dicalcium phosphate, talc, dried fish meal, soybean meal and the like non-toxic orally acceptable diluents. The prepared premix is then conveniently added to the regular ration, thereby providing medication to the bird or animal in the course of its consumption of the said ration. The ready-mixed type is prepared by incorporating the principal active ingredient directly into the ration for consumption without further dilution. The animal and bird feed preparations can be of both the solid and liquid types.

The following examples set forth the best mode contemplated by the inventor for carrying out this invention, but they are not to be construed as limiting the scope thereof.

Example 1

*Veterinary pre-mix*

Ten thousand grams of a pre-mix are prepared by thoroughly mixing 1000 gm. of $N^6$-(2-hydroxyethyl) adenine hydrochloride into 9000 gm. of soybean meal. Each gram of the pre-mix thus contains 100 mg. of active ingredient. The pre-mix is added to the standard ration of cattle to provide a daily dose of 10 gm. of active ingredient for the treatment of shipping fever.

Example 2

*Veterinary bolus*

Ten thousand boluses, each containing 5 gm. of $N^6$-(2-hydroxyethyl) adenine are prepared from the following ingredients:

| | Grams |
|---|---|
| $N^6$-(2-hydroxyethyl) adenine | 50,000 |
| Lactose | 250,000 |

The ingredients are blended and granulated with syrup-starch paste, and q.s. mineral oil is added. The granulation is then dried, lubricated with starch, talc and calcium stearate powders, and compresed with a 1½" x ¹¹⁄₁₆" die. One bolus daily is given to dogs for treatment of distemper.

Example 3

For the active ingredients of Examples 1 and 2 can be substituted the physiologically acceptable acid addition salts, such as the hydrochloride, sulfate, phosphate, citrate, succinate, maleate, tartrate and the like.

What is claimed is:

1. A method for reducing virus titers in animals which comprises: administering to the animal a compound selected from the group consisting of (1) compounds of the formula:

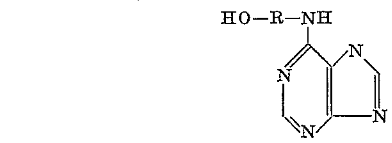

wherein R is selected from the group consisting of methylene and ethylene, and (2) physiologically acceptable acid addition salts thereof, dispersed in a pharmaceutical carrier.

2. A method for reducing virus titers in animals which comprises: administering $N^6$-(2-hydroxyethyl) adenine to an animal infected with virus.

References Cited by the Examiner

Acker: Chem. Abst., vol. 52, p. 20213(f), 1958.

Burger: Medicinal Chemistry, Sec. ed., Interscience Inc., 1960, p. 1103.

JULIAN S. LEVITT, *Primary Examiner.*

FRANK CACCIAPAGLIA, Jr., LEWIS GOTTS, *Examiners.*